Oct. 6, 1925.  1,556,338
G. MANGOLD
CYLINDER COVER FOR INTERNAL COMBUSTION ENGINES
Filed May 12, 1924
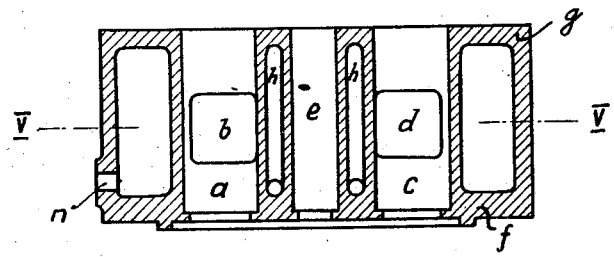
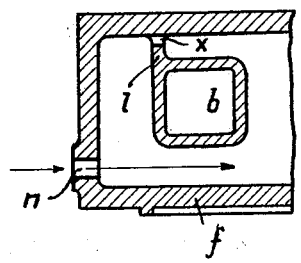 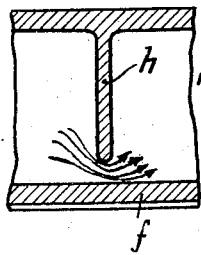 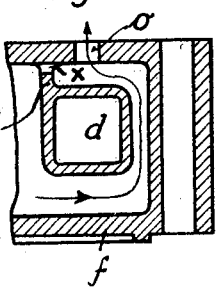
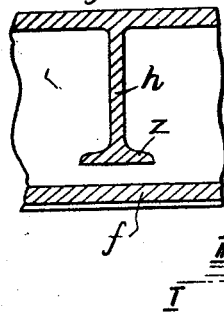 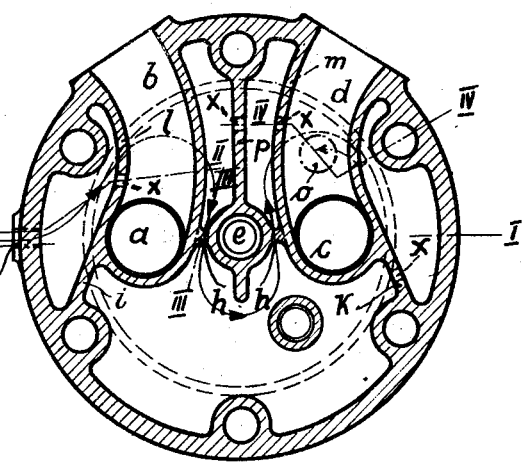
Witnesses:
Inventor:
Georg Mangold Patented Oct. 6, 1925.

1,556,338

UNITED STATES PATENT OFFICE.

GEORG MANGOLD, OF DANZIG-LANGFUHR, DANZIG.

CYLINDER COVER FOR INTERNAL-COMBUSTION ENGINES.

Application filed May 12, 1924. Serial No. 712,819.

*To all whom it may concern:*

Be it known that I, GEORG MANGOLD, a citizen of the Free City of Danzig, and residing at Danzig-Langfuhr, in said Free City, have invented certain new and useful Improvements in a Cylinder Cover for Internal-Combustion Engines, of which the following is a specification.

Heretofore, cylinder covers for large internal combustion engines have become known, in which the required durability is attained by separating the cylinder cover by means of partition wall extending in rectangular direction to the cylinder axis into two unequal parts in such a way that the cooling water is positively guided and passed at high speed along the heated cover wall. Said covers suffer from the drawback that their manufacture is very difficult as two separate cores are required when moulding the same.

The object of the present invention is to attain with four-cycle motors, in which the valves are arranged in the cylinder cover, an improved cooling action by very simple means. For this purpose, the known one-piece cylinder cover is fitted with ribs in the direction of the cylinder axis which permit of the cooling water flowing only along the gas-heated cover wall.

The general idea of guiding the cooling water along the heated bottom wall of the cover by means of ribs parallel to the cylinder axis, is already known. The novelty of the subject matter of the present invention lies in the fact that, with covers of four-cycles motors, only the inlet, fuel, and outlet, valve channels are connected at their outer walls by ribs ending in proper distance from the cover bottom in order to cause the cooling water to flow along the whole gas-heated cover bottom at high speed and with whirling motion.

The accompanying drawing shows the improvement: Fig. 1 is a perpendicular section through a cylinder cover on the line I—I of Fig. 5, while Figs. 2, 3 and 4 are perpendicular sections on the lines II—II, III—III, and IV—IV respectively, of Fig. 5, which is a horizontal section on the line V—V of Fig. 1. Fig. 6 is a similar view to that shown in Fig. 3, illustrating a modification.

$a$ designates the inlet valve channel, $b$ the admission channel to the latter, $c$ the outlet valve channel, $d$ the exhaust channel of the latter, $e$ the fuel valve channel, $f$ the gas-heated bottom of the cylinder cover, $g$ the top of the latter.

According to the invention, the outer walls of the inlet, fuel, and outlet valve channels are connected in the direction of the cylinder axis by one main rib $h$ the lower end of which is at the proper distance from the gas-heated bottom $f$ to allow the water to pass between it and said bottom. In order to attain a positive guiding of the cooling water, further ribs $i, k, p$ connecting the top $g$ with the bottom $f$ and ribs $l, m$ are provided preventing the water from passing above the inlet valve channel and above the outlet valve channel respectively. $n$ is the admission port for the cooling water, and $o$ its outlet port. By said arrangement, the cooling water is forced to take the way indicated by the arrows in Figs. 2 to 5 inclusive. Thus, it passes from $n$ beneath the inlet valve channel $b$ (Fig. 2), through the space between inlet valve channel and fuel valve channel, then through the space between the latter and outlet valve channel (Fig. 5), hence below and around the outlet admission channel $d$, where it finally escapes through the orifice $o$ (Fig. 4).

As known, most of the cracks in such cylinder covers occur at the gas-heated bottom $f$ between the valve channels $a, e$ and $c$, as said points are the most heated. By the arrangement of the rib $h$ the cooling water is forced to flow at high speed through said endangered parts and thereby to effectively cool the same. Said cooling action is further increased by the jetlike action of the rib $h$ whereby a water jet is created which produces a vigorous whirling motion in the cooling water, as indicated by the arrows in Fig. 3. In front of and behind these endangered parts the water is forced by the lower walls of the inlet and outlet valve channels to also flow at high speed along the same and thus along the whole gas-heated bottom.

To further increase the whirling motion aforementioned, the rib $h$ may be provided at its free lower end with a flangelike projection $z$ as illustrated in Fig. 6.

To remove the air from the upper part of the cover, air holes $x$ are provided in the ribs $k, l, m, p$, which however are so small only that the air just escapes therethrough and that they practically do not allow any water circulation. As, thus, in the upper part of the cylinder cover, practically no water circulation exists, the water and thus the top of the cover become hotter than in the cover constructions heretofore known, so that thereby the heat strains between the top and bottom of the cover are reduced to a minimum.

Of course, ribs may not only be arranged between the valves but can also be provided at any other endangered places exposed to a particular heating: this lying within the scope of the present invention.

The advantage of the improved arrangement, above the known art, is that a more effective cooling is attained by a simple and cheap construction.

What I claim, is:

1. In a water-cooled cylinder cover for four-cycle motors, the combination with the inlet, fuel, and outlet, valve channels arranged in said cover, of one main rib connecting the outer walls of said valve channels in the direction of the cylinder axis and the lower end of which is at the proper distance from the gas-heated bottom of the cover to allow the water to pass between it and said bottom with whirling motion, substantially as set forth.

2. In a cylinder cover as specified in claim 1, a flange-like projection at the free lower end of said rib, substantially as and for the purpose set forth.

In testimony whereof I have hereunto set my hand.

GEORG MANGOLD.